UNITED STATES PATENT OFFICE 2,570,334

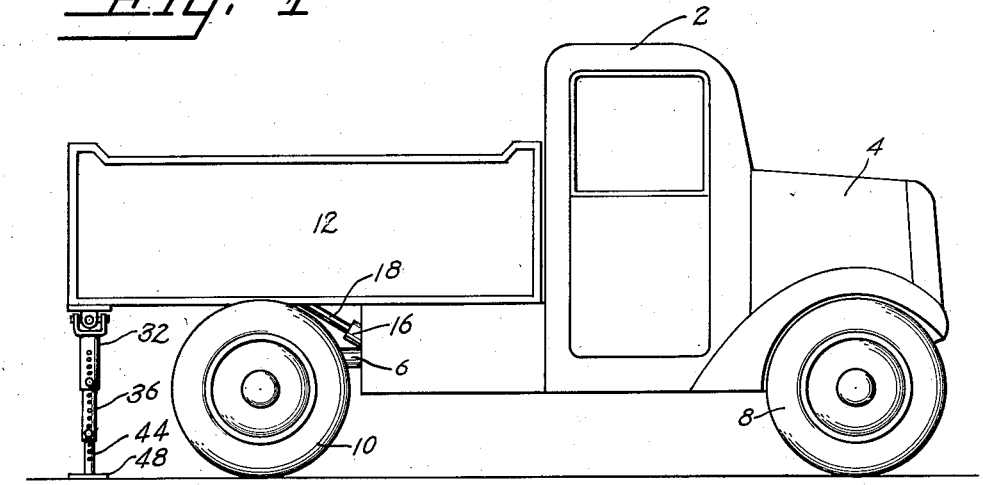
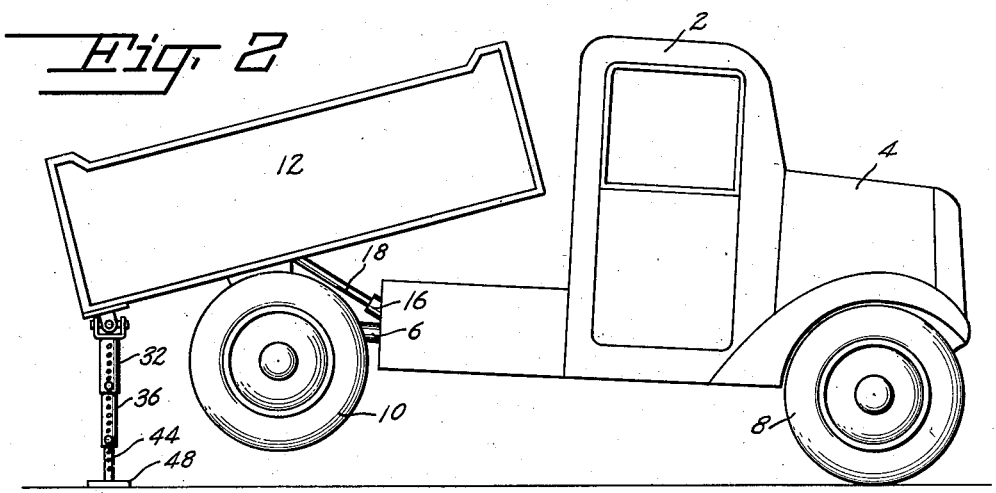
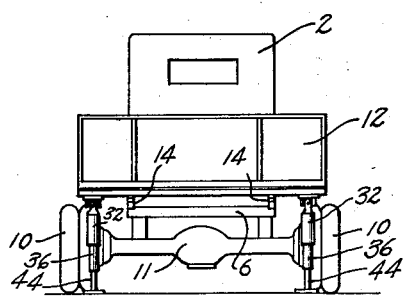

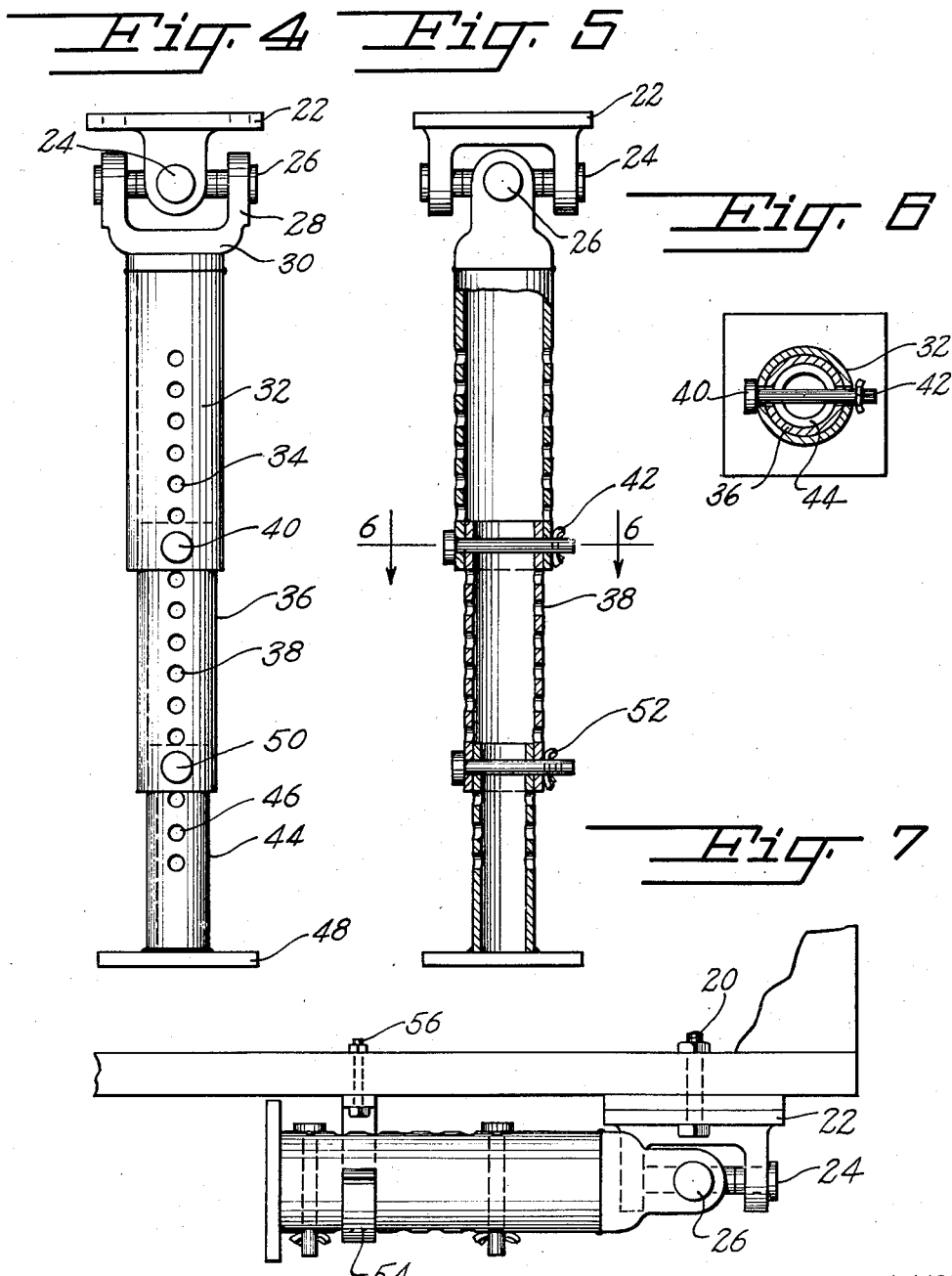

VEHICLE JACKING DEVICE

Frank J. Erjavec, Cleveland, Ohio

Application June 11, 1948, Serial No. 32,467

1 Claim. (Cl. 254—86)

My present invention relates to an improved vehicle jacking device and more especially to a prop comprising a series of telescoping tubes secured to the rear under edge of the body of a dump truck so that by extending the tubes to the ground and elevating the body as by hydraulic pressure, the rear wheels will be elevated from the ground.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is a side elevational view of a truck embodying my invention ready to be raised.

Fig. 2 is a similar view with the rear wheels raised.

Fig. 3 is a rear elevational view.

Fig. 4 is an enlarged elevational view of the prop.

Fig. 5 is a vertical sectional view thereof.

Fig. 6 is a sectional view at line 6—6 of Fig. 5.

Fig. 7 is a view of the prop retracted and swung up to be secured upon the body.

Referring now to the drawings wherein I have illustrated the present prefered embodiment of my invention I have shown a truck having a cab 2 and engine hood 4 on frame 6 carried by front wheels 8 and rear wheels 10 having axle housing 11.

The dump body 12 is pivotally mounted at 14 on the frame and a hydraulic cylinder 16 has a piston 18 by means of which the body 12 may be pivoted.

Under the rear edge of the body I secure by bolts 20 the brackets 22 having shafts 24 pivotal therein, and central of these shafts and extending therethrough I provide shafts 26 in ears 28 of head 30, the sets of shafts 24 and 26 forming gimbals.

From the heads 30 extend tubes 32 having opposed series of holes 34 and slidable in these tubes are tubes 36, having series of holes 38, and pins 40 secured by cotter pins 42 secure these tubes in adjusted position. Within the tubes 36 are tubes 44 having holes 46 and bases 48, and the pins 50 secured by cotter pins 52 retain the tubes 36 and 44 in adjusted position. When not in use the tubes are retracted and swing up to be secured in brackets 54 secured by bolts 56 to the body.

To use the props, the tubes are extended to engage the ground as seen in Fig. 1, and the body is elevated normally by the hydraulic lift whereupon the rear end of the body being unable to lower because of the props will raise the body and elevate the rear wheels from the ground.

The prop of my invention may with facility be employed to allow for changing of tires or other repairs, and will also prove valuable as where the rear wheels are stuck as in mud so that the ground may be filled when the wheels are raised.

Having thus fully described my invention what I claim as new and desire to secure by Letters Patent is:

The combination with a vehicle having a power operated pivoted dump body, of telescoping extensible tubular props, brackets secured to the dump body at a point near the rear edge thereof, a shaft pivotally mounted in each bracket, a second shaft connected to each shaft, heads, upstanding ears on each of said heads pivotally receiving said second shaft and said heads are connected to the upper ends of said props, whereby operation of the body to dump position will raise the rear truck wheels, a base on the lower ends of said props and supporting means for the props when said props are not in lifting position.

FRANK J. ERJAVEC.

REFERENCES CITED

The following references are of record in the file of this patent:

UNITED STATES PATENTS

| Number | Name | Date |
|---|---|---|
| 1,939,950 | Brown | Dec. 19, 1933 |
| 2,345,789 | Brooks | Apr. 4, 1944 |
| 2,402,393 | Griffith | June 18, 1946 |